Mar. 6, 1923.
J. M. W. KITCHEN
METHOD OF AND MEANS FOR TREATING LACTIC FLUID
Filed Dec. 29, 1919
2 sheets-sheet 1
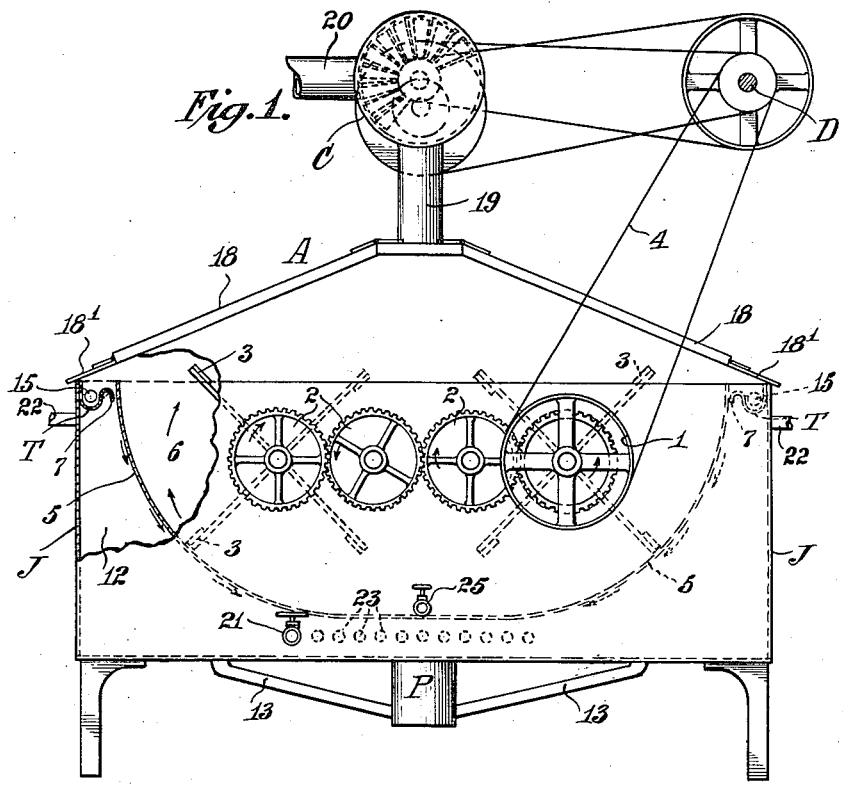
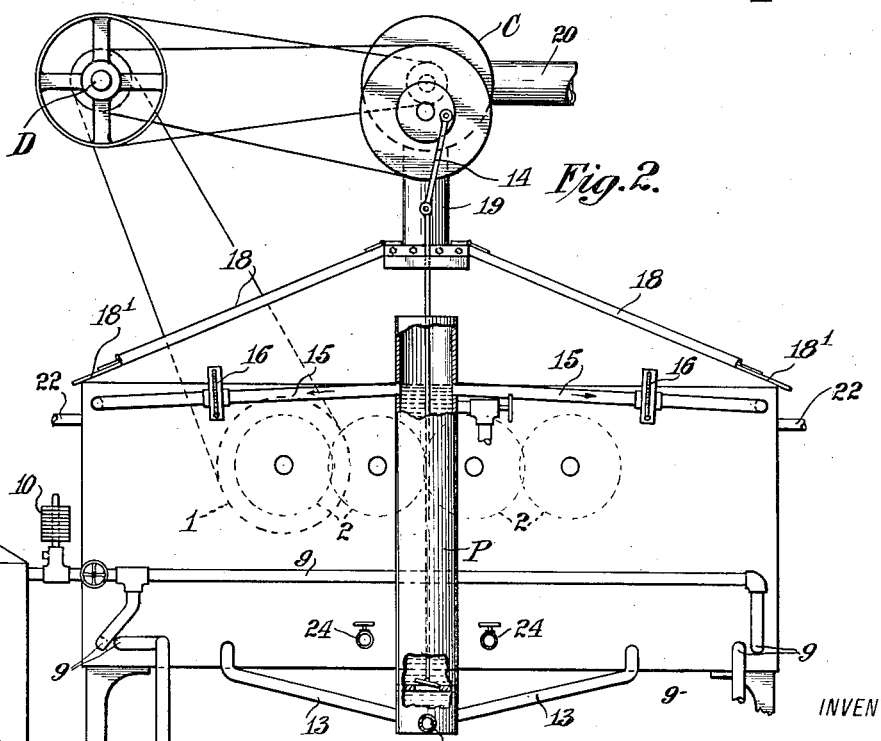
INVENTOR Mar. 6, 1923.                                                    1,447,252
J. M. W. KITCHEN
METHOD OF AND MEANS FOR TREATING LACTIC FLUID
Filed Dec. 29, 1919                    2 sheets-sheet 2

INVENTOR
Joseph Moses Ward Kitchen

Patented Mar. 6, 1923.

1,447,252

UNITED STATES PATENT OFFICE.

JOSEPH MOSES WARD KITCHEN, OF EAST ORANGE, NEW JERSEY.

METHOD OF AND MEANS FOR TREATING LACTIC FLUID.

Application filed December 29, 1919. Serial No. 348,075.

*To all whom it may concern:*

Be it known that I, JOSEPH MOSES WARD KITCHEN, a citizen of the United States, residing in the city of East Orange, county of Essex and State of New Jersey, have invented Improved Methods of and Means for Treating Lactic Fluids, of which the following is a specification.

The object of this invention is to coincidentally pasteurize and eliminate contained contaminating volatile putrid and other ferment products from lactic fluids in an economical, conservative and effective manner, without scorching such fluids; and also, to secure a cooling of the fluid treatment without having fat crystals develop in the fluid during the cooling process. In the apparatus in which I secure this accomplishment I apply the force of gravity in an unusual manner, and thus secure increased economy in the operation, as well as avoid damage to the fluid treated.

Figure 3:
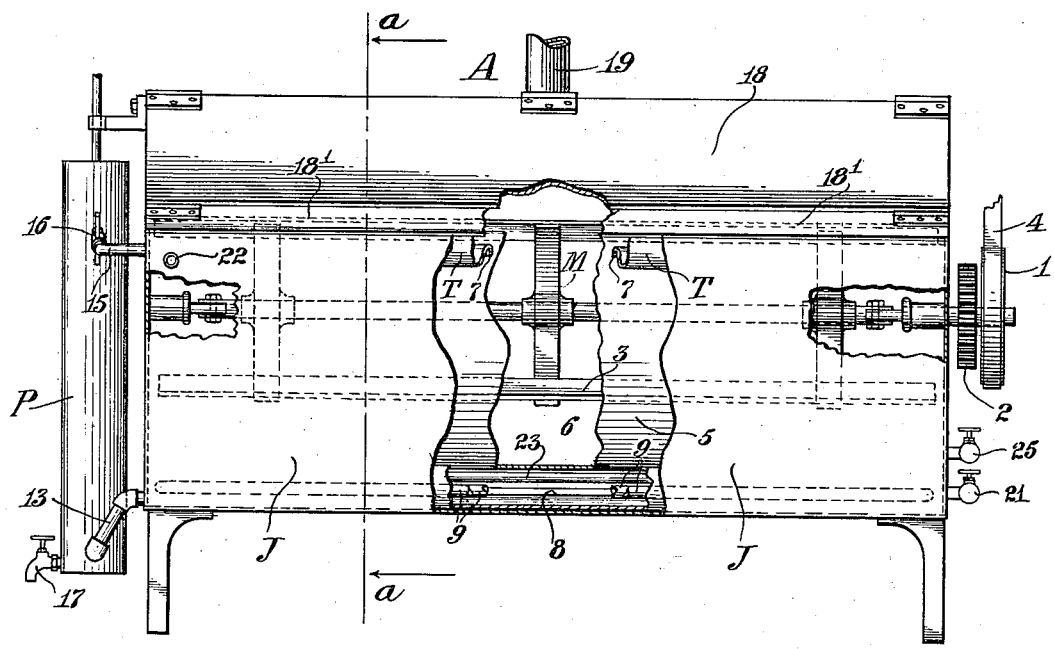
Figure 4:
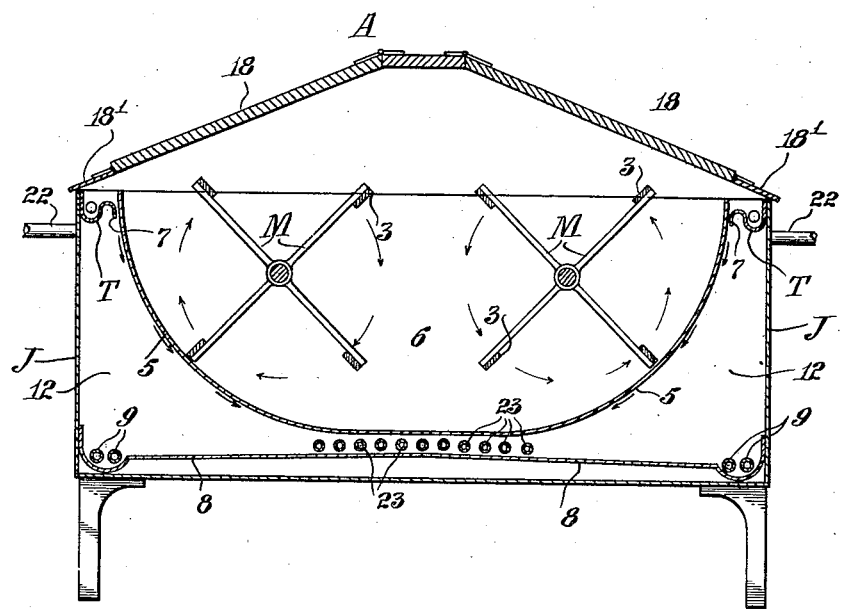

The method and apparatus used, produce hitherto unknown excellent quality in milk, cream and butter. The drawings indicate the nature of the invention. In them Fig. 1 is an elevational view of one end of the apparatus, parts being cut away. Fig. 2 is the other end of the apparatus in elevation, parts being cut away. Fig. 3 is a side elevational view of the apparatus, parts being cut away; and Fig. 4 is an elevational section of the apparatus in part, taken on the line $a$—$a$, Fig. 3.

Bearing in mind that an important aim of the invention is to heat but not overheat the fluid treated, and to eliminate volatile diffusive contaminants therefrom while holding them for a time, and then to cool the fluid, I draw attention to the fact that the apparatus A is an elongated tank, containing a metallic receptacle 6, sitting in a surrounding jacket J, and that if vapor, water or air in the jacket is of a selected moderate temperature, that moderate temperature will be transmitted thru the thin metallic sheet 5 of the receptacle 6, to the contained fluid treated. Also, I call attention to the fact that if a fluid is treated and is given opportunity, it will rise, and that if a warmed liquid containing volatile contaminants is exposed to air, the accentuated diffusive force of hot gases secures the transfer of the contaminants from the fluid to the air in contact with the fluid. In this apparatus I secure a continually renewed surface area of the fluid with air contact by constructing the container of a considerable width, and provide mechanical means to accelerate a quick change and renewal of the surfaces brought into contact with the air and yet avoid any undesirable churning motion in the fluid treated.

In this apparatus I introduce warm vapor such as steam expanded to atmospheric pressure, warm water, or heated air into the jacket J at its highest level; and as the heating water or other agent has contact with the sheet metal 5, and cools thereon, it gravitates downward along the curvature of the receptacle, while the fluid in the receptacle as it becomes heated rises along the sides of the receptacle, the transmission of heat being accomplished by an application of the counter-current principle of heat transfer. As the heated part of the fluid rises along the sides of the receptacle 6, the cooler fluid in the center of the receptacle gravitates, thus inducing an air exposed surface contact between the two sides and the center surface of the receptacle, moisture and volatile matters rising from the surface of the fluid and being exhausted from the apparatus by the fan C and thru the exhaust pipes 19 and 20.

I increase the motion of the fluid induced by heating, by the mechanically actuated paddle floats 3, of the paddle wheels M that are revolved by the gear wheels 2, which are activated by the shaft D, the bolt 4 and the pulley 1. The arrows indicate the direction taken by the moving fluid. The elimination of the fumes from the fluid is hastened by the exhaustive action of the fan C.

The ordinary methods of aerating milk do not eliminate the ferment products that transfuse from the fluid tissues of the cow during the formation of milk. In cream, specially provided methods of eliminating such putrefactive matters is desirable in order to produce the finest quality in butter. In the ordinary cooling of milk while aerating it, these contaminants are held back in the milk and their presence masked by lowered temperatures; but in my method they are eliminated, and without the usual damage of further infecting the milk, cream and butter by air-borne germs. I use this apparatus to eliminate such putrid products in butter already made, by melting the butter and adding sufficient milk, and thru mechanical motion, reconstitute a cream that can be subsequently churned without any increase in infection.

In this apparatus I provide for the cooling of the treated fluid, first by the introduction in the jacket of water of ordinary wellwater temperature, and further by refrigerative piping in the jacket of the apparatus. In cooling the fluid, the motion of the paddle-wheels M is reversed, the cooling water entering the jacket thru the cock 21, and rising to its exit at 22. The lowest temperature of the cooling water is transmitted at the lowest level of the fluid, and the highest temperature of the water is transmitted at the highest level, thus reversing the procedure followed in the heating of the fluid. During the cooling of the fluid, it is kept in moderate motion to prevent the formation of fat crystals; but avoiding churning action; which is effected outside of this apparatus, as a rule; tho churning can be done in this apparatus.

Other reference characters represent as follows: B is a heat-generating boiler; D is a power-transmitting shaft; P is a water-circulating pump; T are water conveying pumps; 7 is the lip of the trough T; 8 is a floor sloping from the center both ways; 9 are steam heating pipes; 10 is a blow-off valve which regulates the temperature of the steam produced in the boiler; 11 is a pressure gauge; 12 is the interior of the jacket J; 13 are conducting pipes which convey water after its heating by the steam pipes 9, to the bottom of the pump P. The pump crank 14, elevates the warmed water which runs thru the pipes 15 to the troughs T. The temperature of the water is taken in the wells 16, and it is preferably not allowed to be higher than 140° F., in treating infants' milk; 17 is a draw-off cock for the pump and entire apparatus; 18 and 18' are lids to the apparatus; 19 is the induced exhaust conduit; 20 is the forced exhaust conduit; 21 is a cold water inlet; 22 are the cooling water exits; 23 are refrigerative pipes; 24 are valves controlling the refrigerative influence; and 25 is the outlet of the fluid-holding receptacle 6.

It will be understood that the control of the temperature of the fluid depends on what is to be done with the fluid. If it is to be bottled and further heated in the bottle, the fluid is withdrawn from the receptacle while hot. If cream is treated for direct consumption, it is chilled to near its freezing point, and then bottled cold.

If fresh cream, or reconstituted cream for churning, is treated, it is cooled to ordinary churning temperature, and preferably is then immediately churned. The product in either case has improved character in being free from live dangerous germs and the usual presence of unsanitary putrid products. This improvement in character is secured by subjecting the fluid treated, for a longer time of heating than ordinary to heat of a lower temperature than is usual, as well as in securing an elimination of contained contaminants by a greater exposure of the fluids to air, and under the influence of a partial vacuum. I prefer to use heating water warmed to a temperature of about 135° F., it being heated by the steam pipe 9, and is there raised by the pumps P and runs into the troughs T, T, which overflow over the lips 7, and runs down the curvatures of the receptacle 6, to and on the sloping floor 8 to the steam pipes 9, which re-heat the water, in its cyclic flow over the heating surfaces 5, 5. In this way the damaging over-heating of any part of the treated lactic fluids is avoided, that always occurs when such fluids are brought into direct contact with surfaces heated by steam under high pressure, in more rapidly effected pasteurization; and in which the "holding" of the fluid is effected in a separate device from that used in heating such fluids. This provision against overheating for and in eliminating putrid volatile matters in lactic fluids is of importance in securing improved character in milk, cream and butter.

It will be noted that in this apparatus I secure a transmission of heat by a travel of the heating medium in reverse direction from that taken by the fluids to be heated. In doing so I economize in heating.

The present invention has been based on a progressive increase of special knowledge acquired experimentally by the applicant, relating to the influence of accumulated, more or less toxic contaminations in the human body, produced both outside and inside of the body of milk producing animals, and in the human alimentary tract, by the fermentation of micro-organisms; and by the cellular metabolic activities of normal bodily, and by infecting invading germs. The first pertinent fact discovered by the applicant, was that the so called off winter flavor of butter was due to a putrefactive fermentation in the sebaceous glands of the cow's hide giving rise to fumes that contaminate the atmosphere of cows' stables, and hence breathed by the occupants of the stable; that these fumes were found in the milk at the moment of the production of the milk and in butter made from the milk. Previously, the experiment stations taught that such malodors were due to the action of bacterial infections in the milk after the production of the milk.

All butter made up to the time of this writing has been more or less contaminated with such volatile, diffusive matters. That this is a fact, can be demonstrated by heating any sample of butter found in open market. By heating the butter the presence of such contaminants becomes apparent to smell and taste. Just which of the many types of the germs that commonly infect milk, produce such products, I do not know; but I have discovered that such putrid products can be eliminated from milk, cream and butter by accomplishments previously described in applicant's copending applications hitherto filed; and preferably in certain instances, by the method herein described.

In the claims I make, when I refer to "volatile," "diffusive," or "putrid" contaminations, I means those ferment products that may be produced by a number of types of germs that in total may be conveniently classed as being of the putrefactive types.

My method accomplishes the aim of the invention by securing a very much longer but more quiescent contact of lactic fluids with air than is usual in pasteurizing apparatuses; and without subjecting the fluid to a churning action; and also, largely protect the fluids from atmospheric infections during the process, and which coincidently more fully eliminates the objectionable contaminants in a very economical manner, and without damage due to high heat. My method avoids the turbulent agitation in the fluid treated that occurs in the driving off of water vapor in condensing pans due to the highly heated coils in the pans, and influenced by a high vacuum exhaust. My method of eliminating the fumes is more of a diffusive process from the upper surface of the fluid-mass heated. Pasteurization is more slowly conducted by me at lower than usual temperatures. The moisture and fumes are removed by a mechanical exhaust, instead of a condensing exhaust.

What I claim as new is:

1. The method herein described which consists in, the process of heating and eliminating volatile contaminations from a bulk of lactic fluid, said process comprising the steps of heating the fluid by the influence of heat first applied at the highest level of the bulk of the fluid and then progressively transmitting heat of progressively lowering temperatures to the fluid being heated at progressively lower levels of the bulk of the fluid.

2. The method herein described which consists in "holding" a lactic fluid in a tank until the fluid is pasteurized, the heating of the fluid being secured by gravitating hot water downward over the sides of the tank, mechanically exhausting air containing fumes from the aerially exposed surface of the fluid, mechanically accelerating a circulatory current of the fluid upwardly along the sides of the tank, centripetally to the center of the tank and downwardly in the center of the tank.

3. The method herein described, which consists in, holding a lactic fluid in a trough-tank comprising sides each constructed incurvedly to the extent of one quarter of a circle, and having a straight level bottom to the trough-tank, heating the fluid by running water downwardly over the incurved sides of the tank, generating steam, heating the water with the steam, pumping the water in cycle from below the bottom of the trough-tank to a level above the trough-tank, conducting the water along the top edge of the trough-tank, securing a flow of the water along the length of the trough-tank onto the top of the incurved sides, and mechanically securing the institution of two circulatory currents in the fluids, each current revolving in reverse direction to the other current.

JOSEPH MOSES WARD KITCHEN.